March 13, 1962     J. D. BEECHER     3,025,114
ANTIFRICTION BEARINGS
Filed Feb. 29, 1960
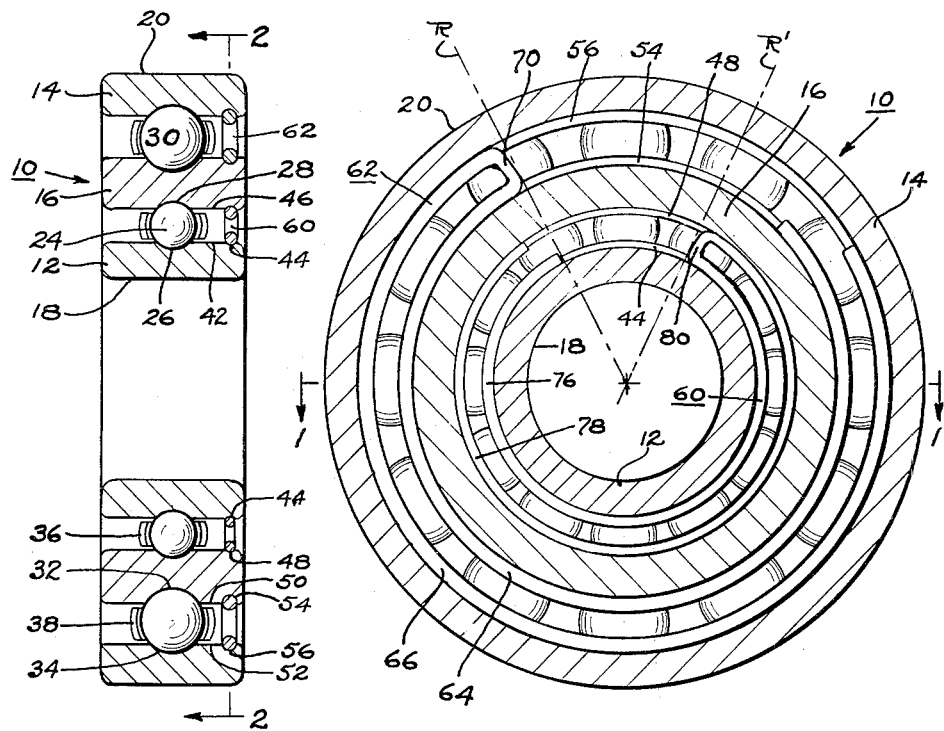
FIG. 1
FIG. 2
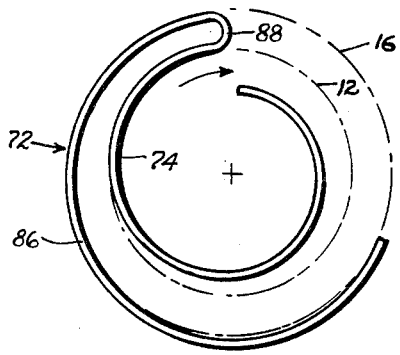
FIG. 4
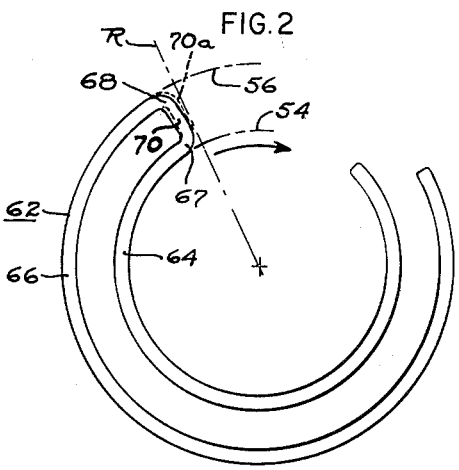
FIG. 3
INVENTOR
JOHN D. BEECHER
BY Edward H. Goodrich.
HIS ATTORNEY

United States Patent Office 3,025,114
Patented Mar. 13, 1962

3,025,114
ANTIFRICTION BEARINGS
John D. Beecher, Plymouth, Conn., assignor to General Motors Corporation, Detroit, Mich., a corporation of Delaware
Filed Feb. 29, 1960, Ser. No. 11,616
12 Claims. (Cl. 308—183)

This invention relates to antifriction bearings and particularly to antifriction bearings which are subjected to arcuate oscillatory movements.

In many antifriction bearing applications, the bearings are used as gimbal bearings wherein one of the bearing race rings repeatedly moves through an arcuate oscillation with respect to the other race ring. When such a bearing is operated under this condition of repetitive arcuate movements and particularly with oscillations of less than 90°, the lubricant within the bearing has insufficient opportunity to feed between the rolling elements and the raceways with the result that even under light bearing loads, fretting corrosion and false brinelling occurs frequently causing a transfer of metal from the balls to the raceways which soon results in bearing roughness sufficient to make the bearing inaccurate and often inoperable. To avoid this objectionable condition that is particularly prevalent in gimbal bearings, it has been common practice to employ a multiple ring antifriction bearing wherein there is an intermediate race ring between and engaged by two concentric rows of radially spaced circumferentially arranged balls. However, even in such a multiple ring bearing, the balls tend to oscillate over the same short arcuate paths, thus still creating the objectionable and damaging conditions of fretting corrosion and false brinelling.

It is, therefore, an object of this invention to provide an improved antifriction bearing wherein the rolling elements are prevented from moving back and forth over the same arcuate paths when the bearing is subjected to arcuate oscillations.

It is a further object of my invention to provide an improved antifriction bearing including circumferentially arranged rolling elements which are limited to unidirectional circumferential movements under the influence of relative arcuate reciprocation of the bearing race rings.

It is another object of my invention to provide an improved antifriction bearing having an intermediate race ring antifrictionally mounted between a pair of other race rings and constrained to move in only one direction circumferentially when said other race rings are subjected to relative arcuate oscillation.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

FIGURE 1 is a cross sectional view of a ball bearing constructed in accordance with my invention and taken along the line 1—1 of FIGURE 2;

FIGURE 2 is an end view in section and taken along the lines 2—2 of FIGURE 1;

FIGURE 3 illustrates my clutch member which imparts unidirectional rotation between a pair of adjacent race rings; and FIGURE 4 shows another form of my clutch member.

My invention is illustrated and embodied in a radial type of ball bearing having three concentric race rings in generally the same plane. However, this invention is applicable to any type of antifriction bearing wherein it is desired to have one race ring advance in only a single circumferential direction during bearing operation when the bearing is subjected to arcuate oscillation.

An antifriction bearing, as 10, herein shown as a multiple race ring bearing, has an inner race ring 12, an outer race ring 14, and an intermediate race ring 16 radially spaced from and in the same general plane with the inner and outer rings. The inner race ring has a central bore 18 therethrough for mounting on a shaft and the outer race ring has a circular peripheral face 20 for suitable mounting in a housing or the like in accordance with usual practice. Relative antifrictional rotation is provided between the inner race ring 12 and the intermediate race ring 16 through a series of circumferentially arranged rolling elements, herein shown as balls 24, which rollingly engage within a radially outwardly facing annular raceway 26 in the inner ring and within a radially inwardly facing annular raceway 28 formed in the intermediate ring 16. Relative antifrictional rotation is provided between the intermediate and outer race rings through an intervening series of circumferentially arranged rolling elements, as balls 30, which are free to roll in an outer annular raceway 32 formed in the periphery of the intermediate ring and which rollingly engage within a radially inwardly facing raceway 34 in the outer ring 14. If desired, the rolling elements 24 and 30 of each set may be circumferentially spaced and guided by annular separators as 36 and 38.

The inner race ring 12 at one side of its raceway 26 is provided with a cylindrical land 42 in which is formed a radially outwardly facing annular groove 44. Similarly, the intermediate race ring 16 at one side of its raceway 28 has a cylindrical land 46 in which is formed an annular groove 48 radially aligned with and opening towards the groove 44. Also, the outer periphery of the intermediate race ring 16 at one side of its raceway 32 and the inner periphery of the outer ring 14 at the same side of its raceway 34 are respectively formed as cylindrical lands 50 and 52 in which are provided annular radially opposing grooves 54 and 56.

A spring clutch member 60 engages within the grooves 44 and 48 to deliver a unidirectional rotational driving force between the inner ring 12 and the intermediate race ring 16, and a generally similar spring clutch member 62 is arranged to deliver a unidirectional but opposite rotational driving force between the intermediate race ring 16 and the outer race ring 14. The outer clutch member 62 which may be bent to form from a spring wire that conformingly fits within the grooves 54 and 56, has a pair of arcuately extending arms 64 and 66 respectively received in these grooves and interconnected at one end preferably through short radius bends 67 and 68 to a generally straight leg 70. One of the arcuate arms as 64 may be of greater circumferential extent than the arcuate length of the other arm and tightly grips its race ring, as the intermediate race ring 16, to remain in fixed relation to this ring. In some instances, it has been found desirable to additionally secure this arm to its race ring by soldering or other suitable fastening means. The other arcuate arm as the outer arm 66 within the groove 56, is in light frictional engagement with the other race ring, as the outer race ring 14. The intermediate leg 70 has a length which slightly exceeds the radial distance between the bottoms of the grooves 54 and 56. As best illustrated in FIGURE 3, this leg is in slightly angled relation to a radius R tangential to the bent portion 67. Also, the length of this leg 70 is such that the arcuate arms 64 and 66 substantially bottom in their respective grooves adjacent the ends of this leg. For clarity of illustration, the bottoms of the grooves 54 and 56 are shown as broken lines in FIGURE 3. When the intermediate race ring 16 is rotatably driven clockwise and in the direction of the arrow in FIGURE 3, the arcuate arm 66 will freely slide clockwise in its groove 56 and the balls 30 will circumferentially advance clockwise between the race rings 16 and 14. At this time, the divergent relation of the leg 70 to the radius R will remain the same or may even slightly increase due to the resilient yielding of the spring clutch member 62 thus allowing the arcuate arm 66 to freely slide in its groove 56. However, when the intermediate race ring 16 has a counterclockwise rotational force imparted to it or when the outer race ring 14 tends to overrun the intermediate ring in a clockwise direction, the light resilient engagement of the spring arm 66 against the walls of its groove 56, will cause the leg 70 to angularly tilt clockwise to a more nearly radial position indicated by the dotted lines 70a wherein the leg 70 will wedge the adjacent portions of the arms 64 and 66 in bottoming relation in the grooves 54 and 56 to lock the intermediate race ring 16 and the outer race ring 14 against relative rotation. In the event that the outer race ring is non-rotatably mounted in a housing at this time, the intermediate ring 16, outer ring 14, and intervening set of balls 30, will remain fixed and rotation of the inner race ring 12 will continue through the rolling action of the set of balls 24. It will be appreciated that one or both of the grooves associated with each clutch member could be eliminated depending on the unidirectional frictional driving engagement of the arcuate spring arms. For example, the spring could be suitably secured as by soldering to one of the race rings and could slidably fit against the cylindrical land on the other race ring with a unidirectional driving engagement.

The spring clutch member 60 which is similar in operation to that of the clutch 62, has an inner arcuate arm 76 fitted within the groove 44 and embracing the inner race ring in non-rotational relation therewith. If desired, the arm 76 may be further secured in position as by soldering or other fastening means. An outer arcuate arm 78 of this clutch member 60 slidably fits within the intermediate race ring groove 48 under light frictional engagement and is connected at its end to the inner arm 76 through a short intervening leg 80 in slightly angled relation to a radius as R' tangential to one end of this leg where it connects to one of the arcuate arms. The arcuate extent of the arm 78 may be less than that of the arm 76 and, like the spring clutch member 62, the spring wire of the clutch 60 permits angular yieldability of the leg 80 where it connects to the arms 76 and 78. This leg 80 operates in the same manner as that of the leg 70 with respect to the adjacent arcuate arms 76 and 78, but diverges with respect to its tangential adjacent radius in the opposite direction from that of the leg 70 thus making the unidirectional driving connection between the inner race ring and the intermediate race ring opposite to that of the unidirectional driving connection between the intermediate and outer race rings. It will be appreciated that in the presence of bearing lubricant normally present in the antifriction bearing, the clutch members will not appreciably impede the relative race ring rotation in non-clutching directions since the arcuate arms as 66 and 78 will be in freely sliding engagement with their respective race rings.

With the parts in the positions shown, when a clocwise rotation is imparted to the inner race ring 12, the leg 80 angularly deflects slightly counterclockwise and into wedging relation between the inner race ring 12 and the intermediate race ring 16 thereby imparting a unitary clockwise rotation to the inner race ring, balls 24 and intermediate race ring 16. This clockwise rotation imparted to the intermediate race ring permits a free clockwise rotation of the intermediate race ring within the outer race ring with a circumferential clockwise advance of the balls 30 since the leg 70 now remains in its illustrated full line angled position and the outer arcuate arm 66 of the clutch member 62 freely slides clockwise within its groove 56. When a counterclockwise rotation is imparted to the inner race ring 12, the leg 80 remains in its illustrated angled relation and the outer arm 78 of the clutch member 60 freely slides counterclockwise within its groove 48 permitting a counterclockwise circumferential movement of the set of balls 24 within the raceways 26 and 28. At this time, the intermediate race ring 16 will be held non-rotational with respect to the outer race ring 14 since the counterclockwise force imparted to the intermediate race ring 16 will cause the leg 70 to angularly deflect clockwise towards a radial position wherein this leg wedges between the intermediate and outer race rings preventing relative rotation of these race rings 16 and 14 and the set of balls 30 therebetween. Hence, whenever even a small arcuate oscillation is imparted to the inner race ring 12, one or both sets of balls 24 and 30 will unidirectionally and intermittently advance and thus be prevented from any repetitive short path arcuate movements within their respective raceways.

In the embodiment of my invention shown in FIGURE 4, there is illustrated another form of spring clutch member 72 having a pair of inner and outer arcuate arms 74 and 86 interconnected at one end as by a curved leg 88. The inner arm 74, which embraces the inner rotatable member in the same manner as that of the clutch members 60 and 62, preferably has a radius which progressively decreases circumferentially of this arm from the leg 88 so that this arm will tightly frictionally grip its inner race ring. Similarly, the outer arm 86, which frictionally engages the outer race member, has a progressively increasing radius circumferentially of the arm so that it will snugly and resiliently fit against the outer race member. The curvatures of the inner and outer arms 74 and 86 adjacent the connecting leg 88 are preferably in lightly conforming relation to the race members which they engage. One of these arms, herein shown as the outer arm 86, is fixedly secured to its race ring, as the outer ring 16, and the other arm, as the inner arm 74, may have a greater length of arcuate engagement with its inner ring, as 12, than the outer arm. With this construction, when the ring, as 16, attached to the outer arm 86, circumferentially turns clockwise as indicated, the inner arm 74 frictionally wraps tighter about the inner ring, as 12, which it embraces and a clockwise turning movement is imparted to this inner ring 12. When the outer ring 16 moves counterclockwise, the corresponding counterclockwise movement of the spring clutch member 72 causes the spring arm 74 to unwrap from the inner ring 12 and to freely slide on this inner ring without imparting any rotation at this time to the inner ring.

It will be appreciated that the clutch spring could also operate in a reverse manner by securing the inner arm 74 in fixed relation to the inner ring 12 in which event the counterclockwise rotation of the spring would impart an opening or unwinding effect to the spring arm 86 producing a unidirectional anticlockwise drive between the spring arm 86 and the outer race ring. Similarly, a clockwise spring clutch rotation would tend to produce a winding effect on the spring arm 86 which would then freely slide against the outer race ring without imparting rotation. A similar spring clutch member but with an opposite unidirectional driving effect is located between the other race rings as 16 and 14. Hence, it will be apparent that these spring clutches will provide a unidirectional driving relation for each set of circumferentially arranged rolling elements 24 and 30 and oscillation of these balls over repetitive arcuate paths is avoided.

I claim:

1. In an antifriction bearing, a pair of radially spaced rotatable rings arranged for relative arcuate oscillation about a common axis, a clutch member between said rings, a leg on said clutch member extending across the radial distance between the rings and tiltable into unidirectional driving engagement with said rings, said leg being secured at one end in fixed relation to one of said rings, and an arcuately disposed clutch member arm extending from the other end of said leg and located in one-way frictional driving engagement with said other ring.

2. In an antifriction bearing, an inner ring, an outer ring and an intermediate ring, said rings being in coaxial radial spaced relation and arranged for relative arcuate movements with respect to each other, a clutch member between the inner ring and said intermediate ring, a leg on the clutch member extending across the space between the inner and intermediate rings and secured in fixed relation to one of said rings, an arcuately disposed arm connected to the other end of the leg and in frictional one-way driving engagement with said other ring, a clutch member between the intermediate ring and the outer rings, a leg on said last mentioned clutch member secured at one end to one of said last mentioned rings and extending across the space between the intermediate and outer rings, an arcuately disposed arm connected to the other end of said last mentioned leg and in frictional one-way driving engagement with the other ring of said last mentioned rings, said legs being arranged to tiltably shift into wedged unidirectional driving engagement with adjacent rings, and said arms being in opposite one-way driving engagement with relation to each other.

3. In an antifriction bearing, a pair of radially spaced rotatable rings arranged for relative arcuate oscillation about a common axis, a clutch member between said rings, a pair of arcuate arms on the clutch member, a generally radially disposed leg on the clutch member extending between said arms, means non-rotatably securing one of said arms to one of the rings, and said other arm longitudinally conformingly fitting against the other ring and engaging said other ring in frictional one-way driving engagement.

4. In an antifriction bearing, a pair of radially spaced rotatable rings arranged for relative arcuate oscillation about a common axis, a yieldable clutch member between said rings, each of said rings having an annular groove radially opening towards the other ring, a generally radially disposed leg on the clutch member and extending between said grooves, an arcuate arm conformingly received in each groove, said leg being connected at its opposite ends respectively to an end of each arm, one of the arms being secured against movement in its groove, and said other arm having a one-way frictional driving engagement with the walls of its associated groove.

5. In an antifriction bearing, a pair of radially spaced rotatable rings arranged for relative arcuate oscillation about a common axis, a clutch member between said rings, a pair of arcuate arms on the clutch member, a generally radially disposed leg extending between the rings and secured to an end of each arm, one of said arms frictionally embracing one of the rings in non-rotatable relation, and the other arm conformingly fitting against the other ring in resilient frictional one-way driving engagement.

6. In an antifriction bearing, a pair of radially spaced inner and outer rotatable rings arranged for relative arcuate oscillation about a common axis, said rings respectively having radially opposed annular surfaces, a clutch member between the rings, clutch member arms longitudinally fitting in resilient conforming engagement respectively with said annular surfaces, a clutch member leg extending between the corresponding ends of said arms, one of the arms being non-rotatably secured to one of said annular surfaces, and the other of said arms resiliently engaging the other annular surface for freely slidable movement thereagainst in one direction of rotation and gripping said other annular surface in non-rotatable engagement in the opposite direction of rotation.

7. In an antifriction bearing, a pair of radially spaced inner and outer rotatable rings arranged for relative arcuate oscillation about a common axis, said rings having radially opposed annular surfaces, one of said surfaces having an annular groove therein radially opening towards the other surface, a clutch member between the rings, a resilient arm on the clutch member conformingly fitting within said groove, a resilient arm on the clutch member conformingly fitting against the annular surface opposed to the groove, a clutch member leg interconnecting said arms and extending between said rings, one of the arms being non-rotatably secured to its associated ring, and said other arm fitting against its associated ring in one-way driving engagement therewith.

8. In an antifriction bearing, a pair of radially spaced rotatable rings arranged for relative arcuate oscillation about a common axis, said rings being respectively provided with radially spaced coaxial annular surfaces in opposing relation, a clutch member between said rings and having a leg extending between said surfaces, an arm arcuately extending from an end of the leg in conformingly fitting engagement with one of said surfaces and secured thereto, a resilient arcuately extending arm projecting from the other end of said leg and fitting against the other of said surfaces, and said last mentioned arm being initially formed with a progressively changing radius to more tightly grip its associate surface at one end of the arm and provide a slidable one-way driving connection between said last-mentioned arm and its associate annular surface.

9. In an antifriction bearing, a pair of radially spaced rotatable inner and outer rings arranged for relative arcuate oscillation about a common axis, the inner ring having an external peripheral annular surface and the outer ring having an internal annular surface radially spaced from said peripheral surface, a clutch member between the rings and having a leg angularly extending between said annular surfaces, the length of said leg between said rings exceeding the radial distance between said annular surfaces, means fixedly locating the outer end of the leg with respect to said internal annular surface, a clutch member arm arcuately extending from the inner end of the leg about said peripheral surface, and the initial radius of the arm in a direction away from the leg progressively decreasing to spring said arm into tighter binding engagement with the inner ring towards the free end of the arm whereby circumferential movement of the arm towards said leg will bind the arm in tight driving engagement with the inner ring and a reverse rotational movement of the arm will release it for freely slidable movement on said inner ring.

10. In an antifriction bearing, a pair of radially spaced rotatable inner and outer rings arranged for relative arcuate oscillation about a common axis, the inner ring having an external peripheral annular surface and the outer ring having an internal annular surface radially spaced from said peripheral surface, a clutch member between the rings and having a generally radially disposed leg extending between said annular surfaces, the length of said leg between said rings exceeding the radial distance between said annular surfaces, means securing the inner end of the leg in non-rotatable relation to said inner ring, an arcuate clutch arm extending from the outer end of the leg into arcuate fitting engagement with said internal annular surface, and the radius of said arm initially progressively increasing away from said leg to locate the free end of the arm in tighter frictional engagement with said outer ring whereby a longitudinal arcuate movement of the arm in a direction away from said leg radially expands the arm into frictional driving engagement with the outer ring and an arcuate movement of said arm in a reverse direction radially contracts the arm causing it to freely slide on said internal annular surface.

11. In an antifriction bearing, a pair of radially spaced rings arranged for relative arcuate oscillation about a common axis, said rings being respectively provided with radially spaced coaxial annular surfaces in opposing relation, a clutch member between said rings, a leg on the clutch member extending between said surfaces in angular relation to a radius through one end of said leg, means locating an end of the leg with respect to one of said rings, and an arcuate arm on the clutch member and extending from said leg in longitudinal conforming engagement with the annular surface on the other of said rings whereby a relative arcuate movement of the rings in one direction will angularly shift the leg into wedged engagement between the annular surfaces to prevent relative ring rotation and a relative movement of the rings in an opposite direction will relieve said leg from binding engagement and allow free continued relative ring rotation in said opposite direction.

12. In an antifriction bearing, a pair of radially spaced rings arranged for relative arcuate oscillation about a common axis, said rings being respectively provided with radially spaced coaxial annular surfaces in opposing relation, a yieldable clutch member between said rings, a tiltable leg on the clutch member extending between said surfaces at a small angle to a radius of the rings touching an end of said leg, and an arcuate arm extending from each end of the leg, said arms matingly fitting against said annular surfaces, one of the arms being fixed with respect to its associated annular surface and said other being longitudinally slidable on its associated annular surface whereby a relative arcuate movement of the rings in one direction will tilt said leg into one-way wedged driving engagement between the annular surfaces and a reversed relative movement of said rings will release the leg from driving engagement for free rotation of the rings in said reverse direction.

References Cited in the file of this patent

UNITED STATES PATENTS

| | | |
|---|---|---|
| 2,453,291 | Wilford | Nov. 9, 1948 |
| 2,479,965 | Ragsdale | Aug. 23, 1949 |
| 2,647,807 | Brunstrum | Aug. 4, 1953 |